(12) United States Patent
Yang

(10) Patent No.: US 11,324,098 B1
(45) Date of Patent: May 3, 2022

(54) GARDEN LIGHTING CONTROL SYSTEM AND METHOD

(71) Applicant: SMART ELECTRIC WORKS CO., LTD., Chang Hua Hsien (TW)

(72) Inventor: Jerry Yang, Taichung (TW)

(73) Assignee: Smart Electric Works Co., Ltd., Chang Hua Hsien (TW)

( * ) Notice: Subject to any disclaimer, the term of this patent is extended or adjusted under 35 U.S.C. 154(b) by 0 days.

(21) Appl. No.: 17/203,760

(22) Filed: Mar. 17, 2021

(30) Foreign Application Priority Data

Nov. 3, 2020 (CN) .......................... 202011208756.7
Nov. 3, 2020 (TW) ................................ 109138154

(51) Int. Cl.
*H05B 47/165* (2020.01)
*H05B 45/325* (2020.01)
*H05B 47/16* (2020.01)
*H05B 47/17* (2020.01)
*H05B 47/155* (2020.01)
*A01G 7/04* (2006.01)

(52) U.S. Cl.
CPC ......... *H05B 47/165* (2020.01); *H05B 45/325* (2020.01); *H05B 47/155* (2020.01); *H05B 47/16* (2020.01); *H05B 47/17* (2020.01); *A01G 7/045* (2013.01)

(58) Field of Classification Search
CPC .. H05B 47/165; H05B 45/325; H05B 47/155; H05B 47/16; H05B 47/17; A01G 7/045
See application file for complete search history.

(56) References Cited

U.S. PATENT DOCUMENTS

| | | | |
|---|---|---|---|
| 7,632,159 B2 | 12/2009 | Nelson | |
| 2012/0262069 A1* | 10/2012 | Reed | H05B 47/16 315/130 |
| 2014/0028198 A1* | 1/2014 | Reed | H05B 47/16 315/152 |

\* cited by examiner

*Primary Examiner* — Daniel D Chang
(74) *Attorney, Agent, or Firm* — Pai Patent & Trademark Law Firm; Chao-Chang David Pai

(57) ABSTRACT

A garden lighting control system includes a power supply control box system for providing the power required by a plurality of connected garden lights, for changing the voltage properties of the provided power at different times, including changing the positive and negative polarity of the supply voltage, modulating the positive and negative polarity conversion frequency, and modulating the positive and negative polarity duty cycle. The garden lights identify the voltage positive and negative polarity, positive and negative polarity conversion frequency, positive and negative polarity duty cycle of the power received, and execute the pre-set lighting function of the garden lights to achieve multi-time-period zone lighting according to the function pre-selected for each garden light.

13 Claims, 12 Drawing Sheets

| Light up \ Function  Power polarity | Timer | D/D |
|---|---|---|
| Positive polarity | ✓ | ✓ |
| Negative polarity |  | ✓ |
| Select switch position | Pass only with positive polarity | Unlimited polarity pass |

(a)

(b)

(a)

(b)

| Output signal / Output terminal / Power polarity | Timer1 | Timer2 | D/D |
|---|---|---|---|
| First time-sharing positive polarity | Enable | Enable | Enable |
| Second time-sharing negative polarity |  | Enable | Enable |
| Third time-sharing positive polarity |  |  | Enable |

FIG. 15

| Light up / Function / Power polarity | Timer1 | Timer2 | D/D |
|---|---|---|---|
| First time-sharing positive polarity | V | V | V |
| Second time-sharing positive polarity |  | V | V |
| Third time-sharing positive polarity |  |  | V |
| Select switch position | t1 | t2 | D/D |

FIG. 16

| Output signal \ Function \ Power signal | Timer1 | Timer2 | D/D |
|---|---|---|---|
| First power signal conversion frequency F=1Hz | Enable | Enable | Enable |
| Second power signal conversion frequency F=5Hz | | Enable | Enable |
| Third power signal conversion frequency F=10Hz | | | Enable |
| Polarity/pulse wave detection circuit detection conditions | F≦2.5Hz | 0.5Hz≦F≦7.5Hz | No limit |
| Output terminal | t1 | t2 | D/D |

FIG. 17

| Output signal \ Function \ Power signal | Timer1 | Timer2 | D/D |
|---|---|---|---|
| First power signal conversion Duty cycle=50% | Enable | Enable | Enable |
| Second power signal conversion Duty cycle=75% | | Enable | Enable |
| Third power signal conversion Duty cycle=100% | | | Enable |
| Polarity/pulse wave detection circuit detection conditions | Duty cycle≦62% | 25%≦Duty cycle≦87% | No limit |
| Output terminal | t1 | t2 | D/D |

FIG. 18

| Function action \ Options \ Power signal | Timer1 | Timer2 | PIR | D/D |
|---|---|---|---|---|
| First power signal conversion frequency F=1Hz Duty cycle=50% | Light up | Light up | | Enable |
| Second power signal conversion frequency F=5Hz Duty cycle=100% | | Light up | Start PIR control | Enable |
| Third power signal conversion frequency F=10Hz Duty cycle=100% | | | Start PIR control | Enable |
| Polarity/pulse wave detection circuit detection conditions | F≤2.5Hz | 0.5Hz≤F≤7.5Hz | F≥2.5Hz & Duty cycle≥75% | No limit |

FIG. 19

| Function action \ Options \ Power signal | Timer1 | Timer2 | PIR | D/D |
|---|---|---|---|---|
| First power signal conversion frequency F=1Hz Duty cycle=50% | Light up | Light up | Start PIR control | Enable |
| Second power signal conversion frequency F=5Hz Duty cycle=100% | | Light up | | Enable |
| Third power signal conversion frequency F=10Hz Duty cycle=100% | | | | Enable |
| Polarity/pulse wave detection circuit detection conditions | F≤2.5Hz | 0.5Hz≤F≤7.5Hz | 2.5Hz≥F≥0.5Hz & Duty cycle≤75% | No limit |

FIG. 20

GARDEN LIGHTING CONTROL SYSTEM AND METHOD

BACKGROUND OF THE INVENTION (a) Field of the Invention

The present invention relates to garden lighting control technology and more particularly to a garden lighting control system and method. The garden lighting control system enables the garden lights to automatically execute the lighting mode selected to achieve the garden multi-time-period zone lighting.

(b) Description of the Prior Art

The conventional garden or outdoor lighting systems are installed in various positions in the garden to provide the necessary lighting after nightfall. For example, as shown in U.S. Pat. No. 7,632,159B2, a lighting system is mainly composed of a control box, a plurality of garden lights, and a power supply line. The garden lights are respectively set in each position of the garden, and then each garden lights are connected to the power supply line, and the power supply line is connected to the control box.

In this way, the control box outputs voltage to the garden lights through the power supply line, so that the control box can uniformly control on/off of the power supply and the garden lights can be turned on and off together.

The basic control function of the conventional control box has a light sensor circuit to achieve dusk to dawn (D/D) power supply control function (referred to as D/D function). Therefore, when the light sensor circuit of the control box detects that night is coming, it will uniformly output a voltage to the garden lights through the power supply line, and light up the garden lights in the garden at the same time to achieve the lighting purpose. When the light sensor circuit detects the dawn, it will cut off the power supply, and then turn off the garden lights. In addition, the control box with advanced functions is equipped with a timer, which allows users to set the time to turn off the garden lights. For example, the lights can be set to turn off after 6 hours. Therefore, the light sensor circuit can detect the signal at night, and the control box will uniformly control all garden lights to turn on at the same time. After 6 hours, the control box will automatically cut off the power supply and turn off the garden lights. Alternatively, the control box can set the time to turn on the garden lights and set the time to turn off the lights according to the timer.

However, the above garden lights under the same control box cannot choose different turn off time or other lighting functions at the same time.

In detail, the above-mentioned conventional garden lighting system, through the detection of the light sensor circuit or the automatic control technology of the timer of the control box, can only uniformly control the garden lights to turn on or turn off under the same power supply line. It does not allow users to set some garden light groups to be on until dawn after night, and some other garden light groups to be turned off in advance after a period of time. In order to achieve the above functions, in theory, a control device can be installed inside or outside each garden light (for example, as shown in US Patent Publication No. US20090195063A1). However, this will cause each garden light to be expensive and the settings to be complicated, and the control box cannot be used to simply control the lighting time of each segment. Or, a control box may be designed to connect to two power supply lines. One of the power supply lines is the power supply circuit controlled by the above-mentioned light sensing circuit, and the other power supply line is the power supply circuit controlled by the above-mentioned timer. In this way, the garden lights are separately connected to each power supply line. In this way, some garden light groups can be lit until dawn after night, and some other garden light groups can be turned off in advance after a period of time. However, in this way, two power supply lines must be buried in the garden when wiring. If you have to turn off some garden lights at multiple times before dawn (for example, 9 p.m., midnight, and 3 a.m.), then 4 power supply lines will be needed, which is not only more costly, but also troublesome to construct.

For this reason, on the basis of one power supply control box system and one power supply line, it would be an innovation to allow users to connect multiple garden lights on the same power supply line and independently control the on/off of each garden light at dawn or at a set time, without adding other power supply lines (power supply circuits) nor implementing high cost automatic control devices. For example, by using a switch inside or outside each garden light or by selecting a different pin according to the electrical connector plugging, certain garden light groups (such as aisle lights) can be turned on after nightfall until dawn, and certain garden light groups (such as landscaping lights) can turn off at the time set by the control box, thereby realizing low-cost multi-time-period district lighting functions.

As mentioned in the previous technology, the conventional garden light and outdoor light systems use a control box to uniformly control the lighting and turn-off time of each garden light, achieving the purpose of unified lighting control. However, with the diversification of the use of modern living spaces, there are different lighting needs for different outdoor spaces. For example, the key safety protection space needs to be provided with lighting until late at night or throughout the night, and the lighting of other spaces can be turned off before midnight to achieve energy-saving effects. Lanes or pedestrian paths can light up when people and vehicles approach, and the lights or small lights in the lanes of pedestrian paths can be turned off after people or vehicles leave. In some areas, in order to meet the needs of landscape or to create desired atmosphere, as time, temperature or season changes, it must be automatically changed to provide different color temperatures and brightness in the lighting. All these requirements cannot be satisfied by the above-mentioned conventional garden light and outdoor light control systems.

SUMMARY OF THE INVENTION

The present invention has been accomplished under the circumstances in view. It is therefore the main object of the present invention to provide a garden lighting control system and method, which controls the selection of various lighting functions for each garden light by changing the power supply polarity, modulating the positive and negative polarity frequency or modulating the positive and negative polarity duty cycle, so as to meet the lighting needs of different functions and different light off periods.

The garden lighting control system comprises a power supply control box system, an optional group control device, garden lights and the connection between them. The power supply control box system is mainly to provide function settings and control, and provide the required power for the garden lights and the group control device. Garden lights can be set as independent garden lights or into garden light groups. The garden light groups are installed to be under the control of the group control device, and the group control device uniformly controls the lighting time and brightness of the garden lights in each garden light groups. The independent garden lights are installed directly under the control of the power supply control box system to receive power and control from the power supply control box system. The function settings of each independent garden light determines the lighting period, brightness, color temperature, function, etc. Therefore, the device and control method of the present invention can provide multiple function control of each garden light or garden light group to meet the needs of division lighting. In addition, through the positive and negative polarity conversion control of the device of the present invention, the problem of line corrosion caused by the electrolysis effect of the fixed polarity of the DC power source for a long time can also be reduced.

BRIEF DESCRIPTION OF THE DRAWINGS

FIG. 15 is a truth table of the action of the polarity/pulse wave detection circuit of the multi-division function embodiment of the present invention.

FIG. 16 is a system protocol of a multi-division function embodiment of the present invention by changing the polarity of the power voltage.

FIG. 17 is a system protocol of a multi-division function embodiment of the present invention by modulating the polarity frequency of the power voltage.

FIG. 18 is a system protocol of a multi-division function embodiment of the present invention by modulating the positive and negative polarity duty cycle of the power and voltage.

FIG. 19 is a system protocol of a compound multi-division function embodiment of the present invention.

FIG. 20 is another system protocol of the compound multi-division function embodiment of the present invention.

DETAILED DESCRIPTION OF THE PREFERRED EMBODIMENTS

Figure 1:
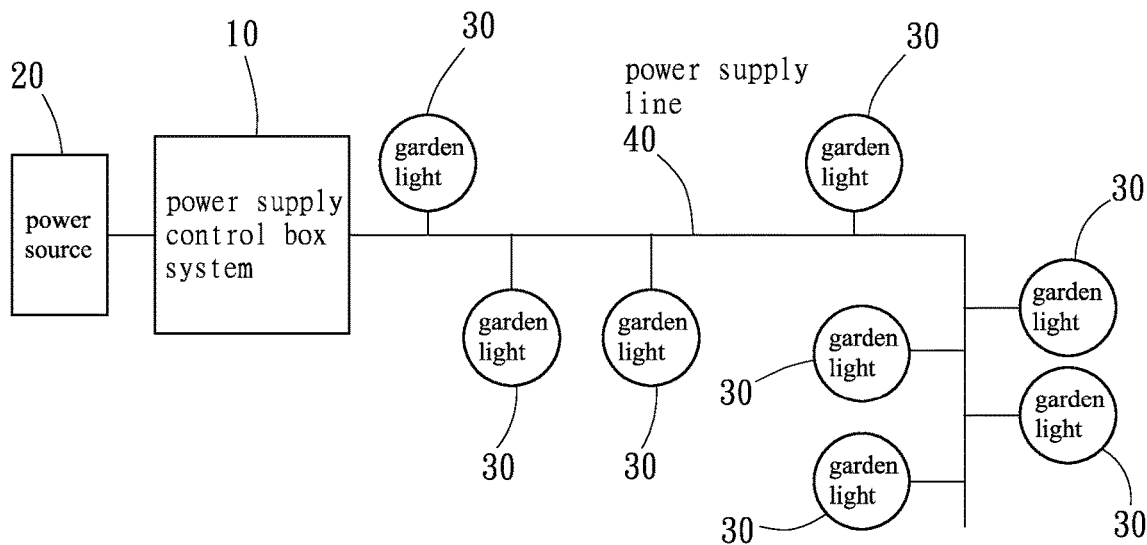
FIG. 1 is a block diagram of the embodiment system of the two-division function of the present invention.

Referring to FIG. 1, a garden lighting control system in accordance with the present invention generally comprises a power source 20, a power supply control box system 10 electrically connected to the power source 20, a power supply line 40 electrically connected to the power supply control box system 10, and a plurality of garden lights 30 electrically connected to the power supply line 40.

The power supply control box system 10 is used to provide the power required by the garden lights and receive the day and night signals from the light sensor circuit for detecting whether it is day or night. The timer circuit of one or more internal timing units of the power supply control box system 10 turns off power supply output during the day, and outputs different voltages at different times at night, containing attributes such as changing the positive and negative polarity of the supply voltage, modulating the positive and negative polarity, changing the frequency, or modulating the positive and negative polarity duty cycle. The power supply control box system 10 is used to provide the power required by the garden lights 30 connected via the power supply line 40, and then the garden lights 30 can identify the voltage positive and negative polarity, the positive and negative polarity conversion frequency, the positive and negative polarity duty cycle and other states, and according to its state or state change, compare them with the selection of the garden light function setting switch and execute the predetermined action (lighting function) to achieve multi-time-period zone lighting.

The above-mentioned power supply control box system 10 changes the attribute content of the power voltage provided and the number of changes, based on the complexity of the system function. Take the simple two-division multi-time-period function as an example. The first multi-time-period period is the time period starting from the time of nightfall to the first set time point set by the timer circuit of the above internal timing unit. The second multi-time-period period starts immediately after the first multi-time-period time period and ends at dawn. The power supply control box system 10 outputs power with a positive polarity voltage (a first voltage waveform) during the first multi-time-period period, and outputs power with a negative polarity voltage (a second voltage waveform) during the second multi-time-period period. It turns off the output power at the end of the second multi-time-period period. Therefore, all the garden lights 30 start to light up after nightfall. This is the first action of the garden lights 30. The garden lights 30 set for the first division multi-time-period will turn off or dim the brightness after the first set time point. This is the second action of the garden lights 30. The garden lights 30 set for the second division multi-time-period will turn off the lights after the second multi-timeperiod (i.e. after dawn). If the power supply control box system 10 is based on a three-division multi-time-period function, the three multi-time-period periods are: the first period from the end of the day to the first set time point, the second period from the first set time point to the second set time point, and the third period from the second set time point to dawn. The power supplied by the power supply control box system 10 during the three periods will be delivered in order of positive polarity, negative polarity, and positive polarity voltages (first, second, and third voltage waveforms) according to the above three multi-time-period periods, and will be turned off at dawn. In the same way, if multi-time-period is required, use any set time point after nightfall until dawn and dawn, and adjust the power voltage polarity conversion, polarity conversion frequency, and polarity conversion duty cycle of the voltage waveform to make the selected The garden lamp 30 performs more conversion actions to achieve more divisional multi-time-period function control.

The power supply control box system 10 uses the above-mentioned voltage polarity conversion method to output power in different multi-time-period periods, and the polarity can also be reversed. Take the three-division multi-time-period as an example, the power supply control box system 10 may output power in sequence of negative polarity, positive polarity, negative polarity and finally turn off the power, or output power in sequence of positive and negative polarity frequencies F1, F2, F3, and finally turn off the power, or output power in sequence of positive and negative polarity duty cycle Duty1, Duty2, Duty3 and finally turn off the power. If the function of garden light control is not only to turn on and off the lights, but also to control brightness, light color or other functions, then the power output by the power supply control box system 10 can be controlled to change the frequency and duty cycle of the polarity according to the needs.

For example: in sequence of F1&Duty1, F2&Duty1, F3&Duty2, and finally turn off the power. The conversion frequencies F1, F2, F3 represent the first, second and third time sharing respectively, and the duty cycles Duty1 and Duty2 represent 100% brightness and 30% brightness, respectively.

When in the first multi-time-period period, the garden lights 30 that turned on at the second multi-time-period period are all on, the garden lights 30 that turn on at the third multi-time-period period and that have a built-in dimming unit turn to 30% brightness, and the garden lights 30 that turn on at the third multi-time-period period and that have no dimming unit will still remain fully bright.

In order to illustrate the innovative content and features of the present invention in detail, several embodiments are listed below from simple to complex, and a light sensor circuit of a day and night detection unit and a timer circuit of an internal timing unit are set in the power supply control box system 10.

Figure 13:
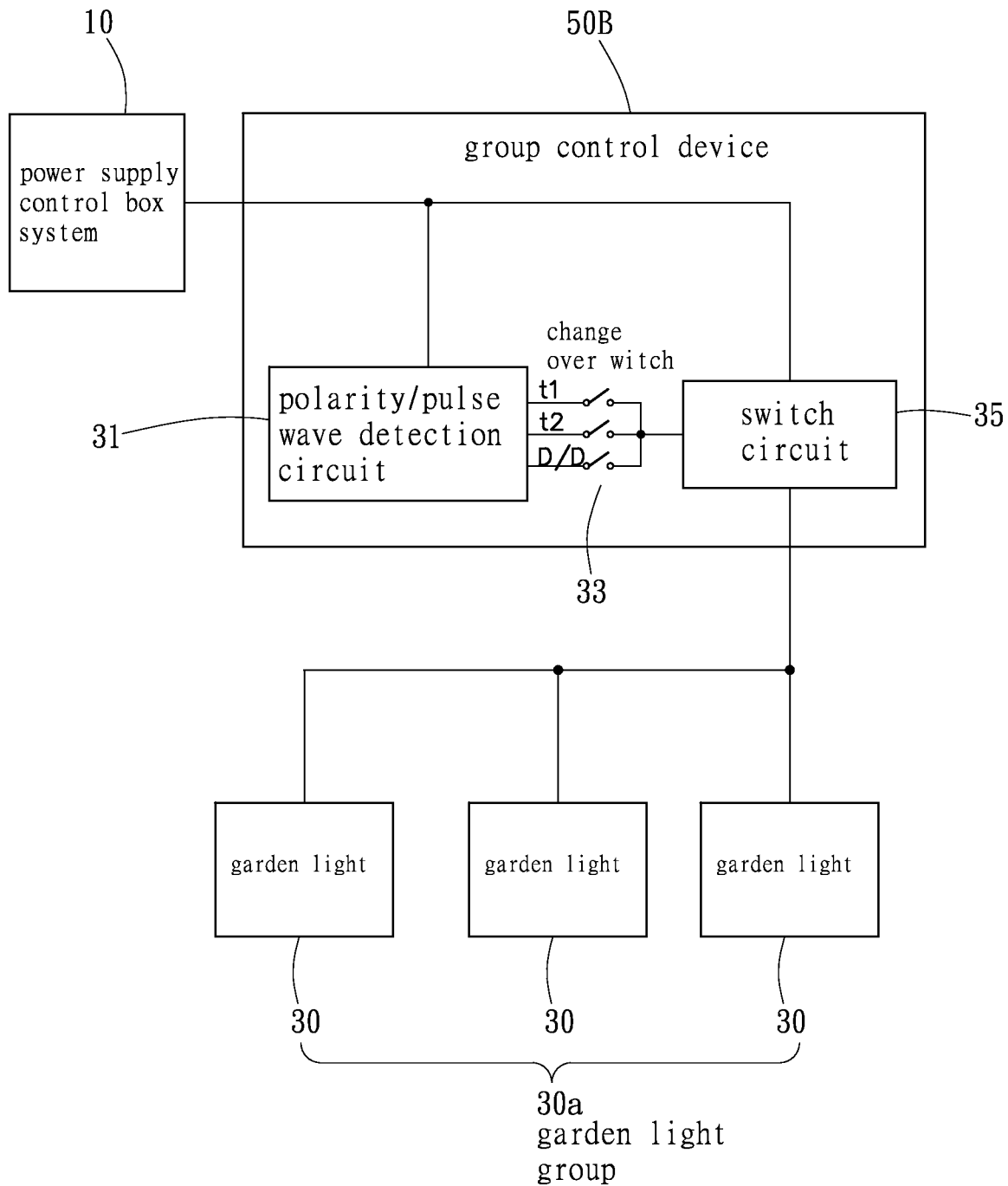
FIG. 13 is a block diagram of the group control device and the controlled garden light group of the present invention.

For each garden light 30 the required function mode is selected according to the installation partition requirements. According to the different voltage properties of the output of the power supply control box system 10, including changing the transmission polarity, modulating the positive and negative polarity conversion frequency, and or modulating the positive and negative polarity duty cycle, different partition garden lights 30 are controlled to turn on and off. Other PIR (passive infrared) control units that expand and integrate functions such as motion detection (PIR) are installed in each independent garden light or group control device (See FIG. 13 and accompanying description below). However, the scope of the present invention is not limited to the combination of these embodiments, which will be further explained in the following Example of garden light two-division multi-time-period function:

In this embodiment, each garden light in the garden lighting control system provides users with two options: turning on the garden lights at nightfall and turning off the garden lights at dawn (i.e. turn on the garden lights at night and turn off the garden lights during the day, also known as Dusk to Dawn, D/D function), or turning on the garden lights at nightfall and turning off the garden lights after the time set by the timer circuit (Timer function). Namely, the garden lights in the garden form two garden light groups with different functions. The following describes the implementation of this embodiment:

FIG. 1 shows a system block diagram of the two-division function embodiment of the garden lighting control system of the present invention. According to this embodiment, the garden lighting control system comprises a power supply control box system 10 for receiving power supply from a power source 20, and a plurality of garden lights 30 electrically connected to the power supply control box system 10 by a power supply line 40. Each garden light 30 allows the user to select the above D/D function or Timer function according to its installation area or purpose, in order to achieve the multi-time-period and zone control of its lighting.

Figure 2:
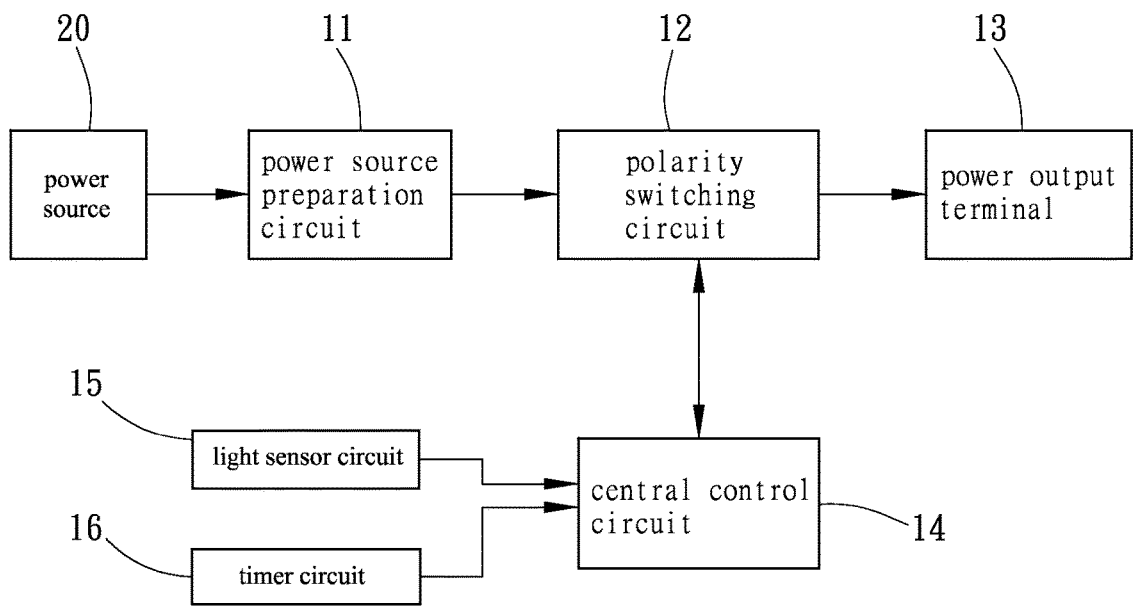
FIG. 2 is a block diagram of the circuit function of the power supply control box system of the present invention.

FIG. 2 is a functional block diagram of the power supply control box system 10 of the present invention. The power source 20 is connected to the main power circuit of the power supply control box system 10, in which the power provided passes through a power source preparation circuit 11, then through a polarity switching circuit 12, and then to a power output terminal 13, so as to connect to the outside garden lights 30 through the power supply line 40. The power supply control box system 10 implements a central control circuit 14 to receive load loop current and voltage, and the signals from a light sensor circuit 15 and a timer circuit 16. The central control circuit 14 determines the lighting control timing, and then controls the polarity switching circuit 12 to output the power required by garden lights 30 and use polarity conversion to match the circuit of the garden lights 30, thereby achieving the function of multi-time-period and zone lighting.

Figure 3:
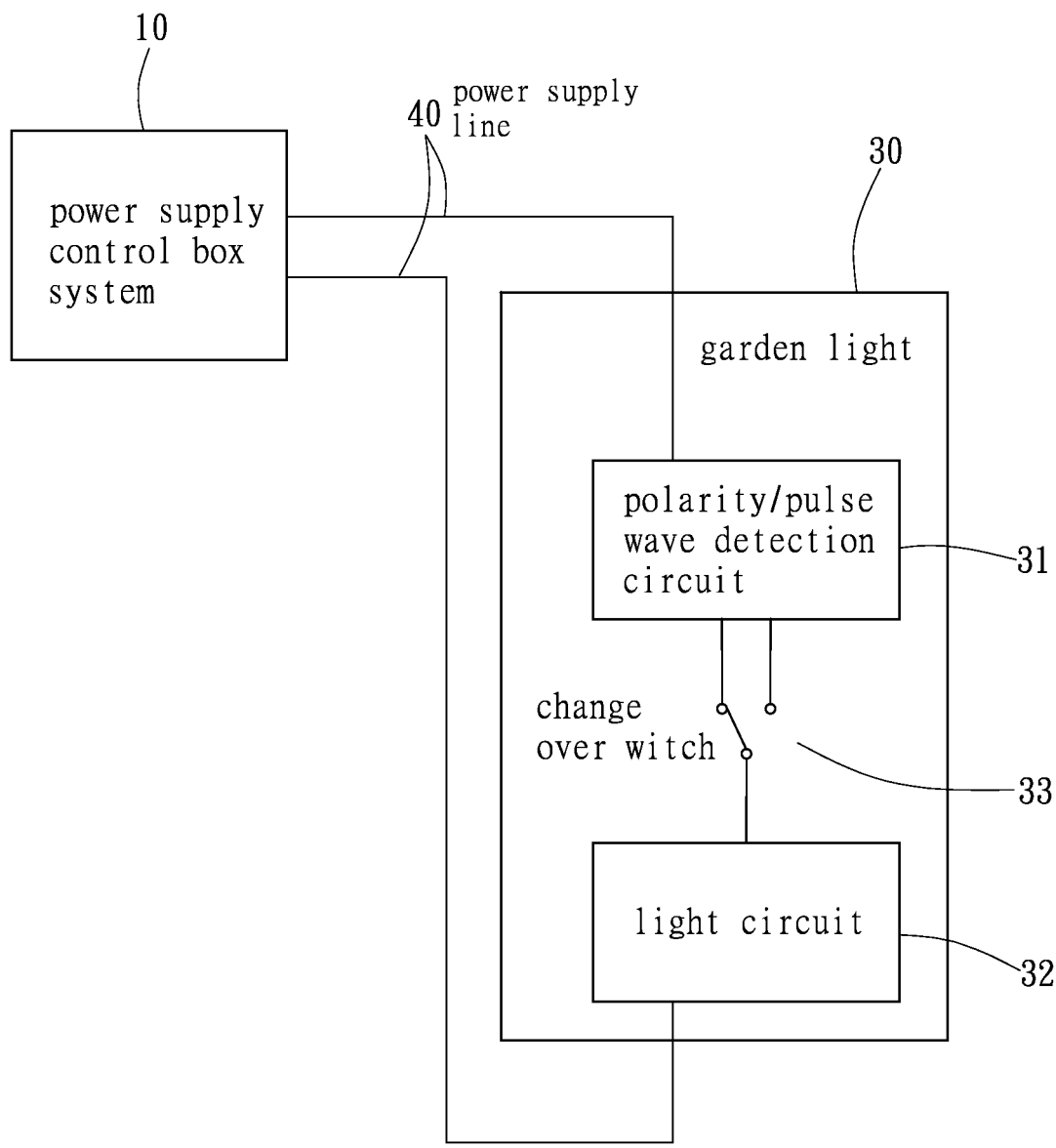
FIG. 3 is a block diagram of the internal circuit of the garden light with two-division function of the present invention.
Figure 4:
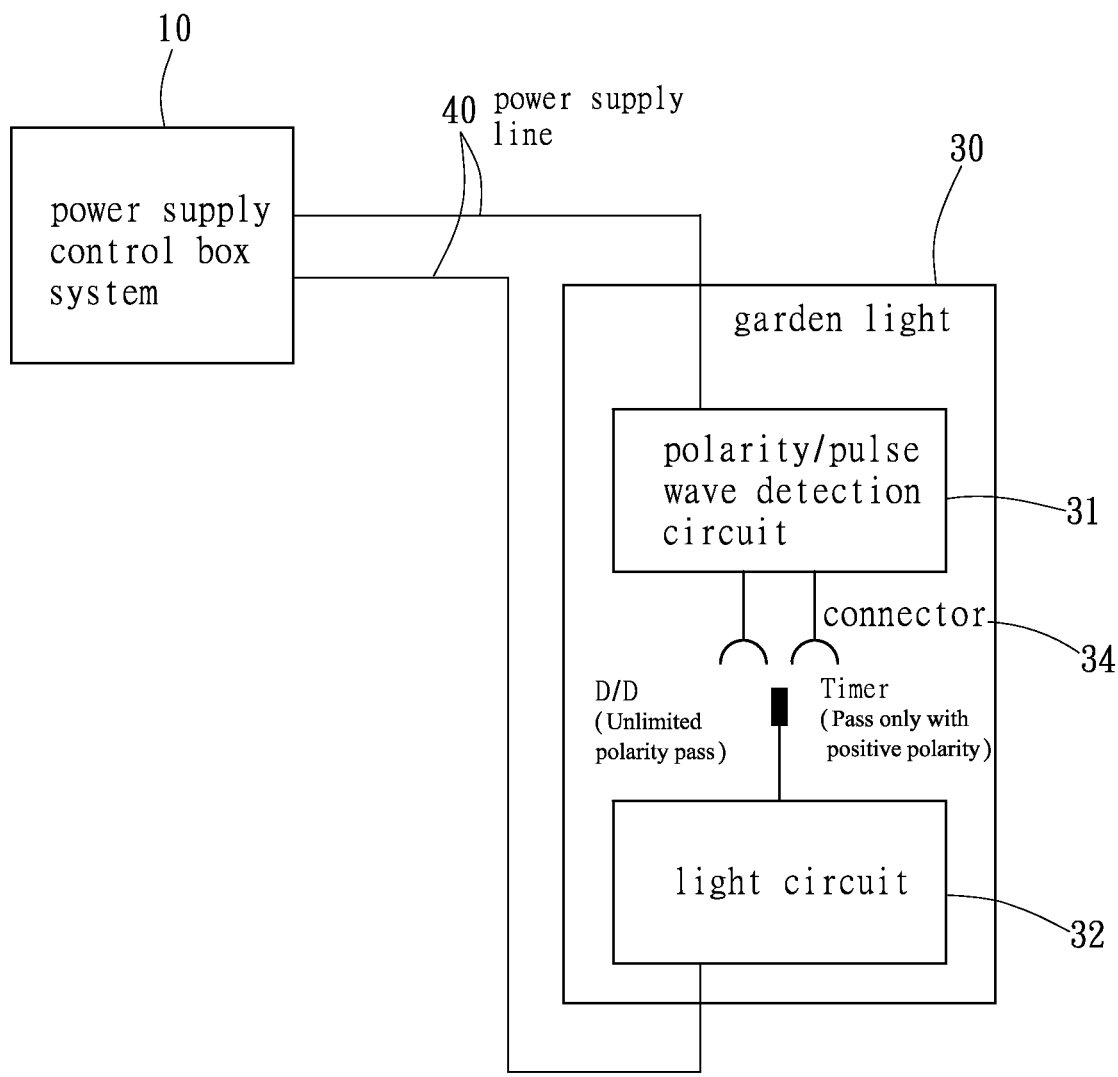
FIG. 4 is a schematic diagram of the quick connector of the present invention instead of change over switch.

FIG. 3 is a block diagram of the internal circuit of a garden light 30. The garden light 30 is mainly composed of a polarity/pulse wave detection circuit 31, a light circuit 32 and a change over switch 33. The polarity/pulse wave detection circuit 31 can detect the polarity of the voltage sent by the power supply control box system 10, and provide "positive polarity pass only" (this embodiment uses positive polarity description, alternatively it can be designed to only pass negative polarity) and "unlimited polarity pass" two alternative paths. The light circuit 32 mainly has traditional lamps, one or more LED lamps. The change over switch 33 is used to provide users with the ability to switch the function mode (D/D function or Timer function) in advance after connecting the garden light 30 to the power supply line 40. As shown in FIG. 4, a connector 34 may be used in place of the change over switch 33.

Figures 5, 6:
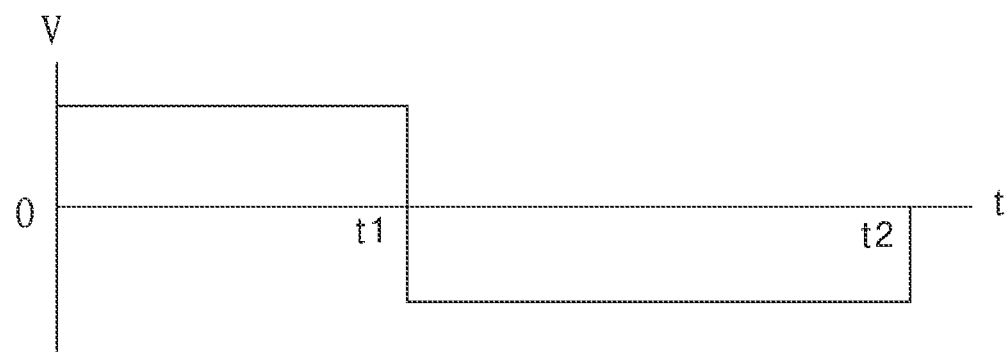
FIG. 5 is the protocol between D/D, Timer function and power polarity conversion in the two-division function embodiment of the present invention.
FIG. 6 is a schematic diagram of the polarity and conversion time of the DC supply voltage of the first power and the second power of the present invention.

FIG. 5 shows the protocol of the D/D function, Timer function and power polarity conversion in this embodiment. The power voltage polarity sent by the power supply control box system 10 is shown in FIG. 6. When it is night, the system refers to the information of the light sensor circuit 15 and the timer circuit 16 so that the central control circuit 14 controls the polarity switching circuit 12 to first output the positive polarity voltage (the first voltage waveform) to the power supply circuit (power supply line 40). At this time, all the garden lights 30, regardless of whether their change over switch 33 is switched to "positive polarity pass only" or "unlimited polarity pass", will receive power and perform the first action of lighting up. For example, the change over switch 33 of the first garden light 30 is switched to the first path of "positive polarity pass only", and the change over switch 33 of the second garden light 30 is switched to the second path of "unlimited polarity pass". The first power signal with this positive polarity makes the first and second garden lights 30 turn on. When the timer circuit 16 of the power supply control box system 10 above reaches t1 (for example, midnight), it will switch to sending a negative voltage (the second voltage waveform). At this time, the change over switch 33 of the first garden light 30 is set to the first path of "positive polarity pass only", because the voltage polarity changes, the light circuit 32 cannot form a current path and turns off the light. The change over switch 33 of the second garden light 30 is set to the second channel of the "unlimited polarity pass", which is not limited by the polarity of the power voltage and can still keep on lighting. Until the light sensor circuit 15 of the power supply control box system 10 detects the dawn at t2, it will notify the power supply control box system 10 to stop the power transmission, that is, all garden lights 30 will be turned off.

Figure 7A:
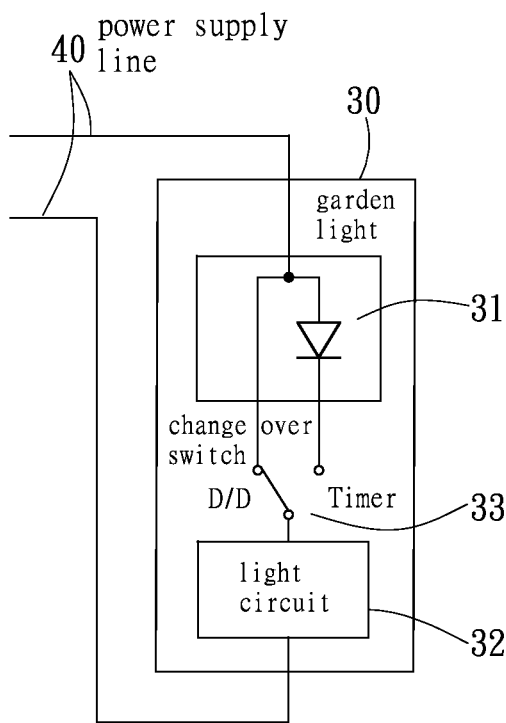
FIGS. 7A and 7B are schematic diagrams of two examples of garden light circuit in the two-division multi-time-period function embodiment.
Figure 7B:
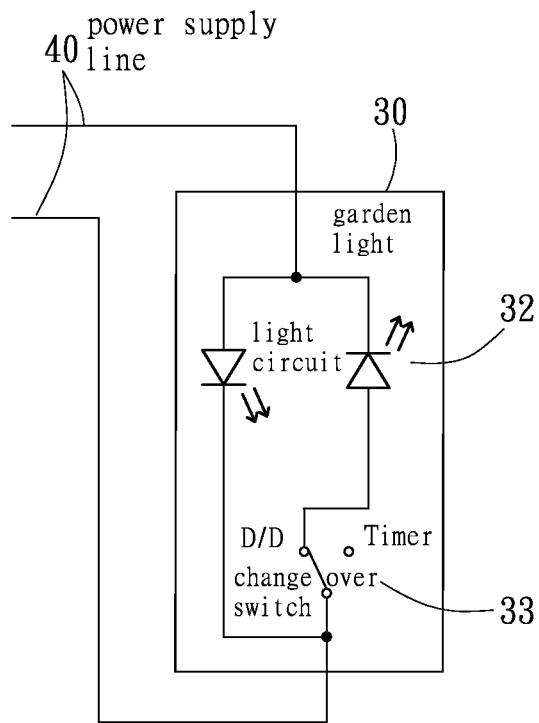

FIG. 7A and FIG. 7B show two examples of the internal circuit of the garden lights 30 in this embodiment (but the present invention is not limited to this type of circuit). Following the description in the previous paragraph and the agreement of this embodiment in FIG. 5, if the change over switch 33 of the garden light 30 is switched to the "positive polarity pass only", the light is selected as the "Timer" control function. This path is from the power supply line 40, such as FIG. 7A through a series connection diode of the polarity/pulse wave detection circuit 31, the change over switch 33, and then to the light circuit 32. When the central control circuit 14 outputs a positive polarity voltage (the first voltage waveform), the internal diode of the polarity/pulse wave detection circuit 31 can be turned on in a forward direction, allowing the light to be turned on. Or as the light circuit 32 of FIG. 7B, where the LED unidirectional conduction and luminous characteristics are used to integrate the polarity/pulse wave detection circuit 31 into the light circuit 32, which is especially suitable for LED lamp circuits. The power is turned on through the LED on the left. When the above-mentioned power supply control box system 10 is converted to send out the negative polarity voltage (the second voltage waveform), the diode inside the polarity/pulse wave detection circuit 31 in FIG. 7A is reversed and unable to conduct, and the light is off. In the light circuit 32 of FIG. 7B, the only left LED route is also reversed and cannot be turned on, and the lights are turned off.

For the garden light of which the change over switch 33 switches to "unlimited polarity pass", that is, the light is selected as the "D/D" control function, the internal path of the polarity/pulse wave detection circuit 31 of FIG. 7A is not limited by the polarity of the power supply voltage, and the light circuit 32 of FIG. 7B can be turned on through the right LED route, so these garden lights can keep on lighting till dawn. Then the garden lights are turned off because the power supply control box system 10 stops delivering power.

Figure 8:
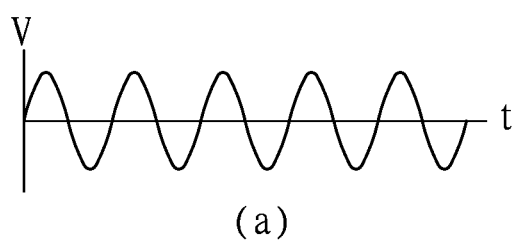
FIG. 8 shows schematic diagrams of the AC voltage polarity and conversion time of the first power and the second power of the present invention.
Figure 8:
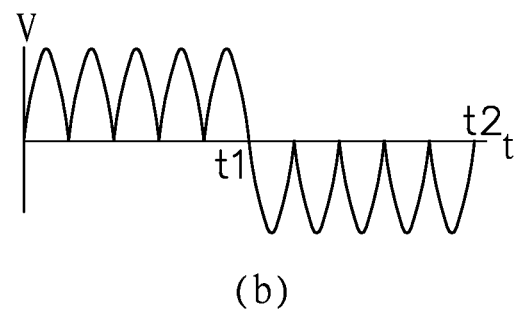

The power used by the device of the present invention is not limited to DC power, but can also be AC power. FIG. 8 shows the general AC power supply waveform in diagram (a). In this embodiment, it can be fully rectified by the internal power supply preparation circuit 11 of the power supply control box system 10. Then, according to the aforementioned principle when it is dark, the positive polarity voltage is transmitted first. After the time t1 set by the timer circuit 16, the power supply control box system 10 is then converted to transmit the negative polarity voltage (the second voltage waveform), as shown in diagram (b) in FIG. 8. In this way, some of the garden lights 30 (that is, those with their change over switch 33 set to "positive polarity pass only") are turned off first. The rest of the garden lights 30 will stop transmitting power until the light sensor circuit 15 of the power supply control box system 10 detects dawn at time t2, that is, all the garden lights are turned off. The operating procedure is the same as the aforementioned DC system.

It can be seen from the example above that the garden lighting control system of the present invention solves the problem of the prior art design that the same garden lighting system can only select all garden lights to perform D/D function or Timer function. Using the method of the present invention, multiple garden lights 30 on the same power supply line 40 are enabled to have garden lights in certain areas to perform D/D function, and garden lights in other areas to perform Timer function at the same time. In turn, it meets the needs of multi-time-period and zone lighting without the need to implement multiple loops.

Multi-Division Function Embodiment:

Continuing with the principle of the aforementioned two-division function embodiment of D/D function and Timer function, the power supply control box system 10 of the present invention can use voltage polarity change times, different modulation positive and negative polarity conversion frequencies or different modulation positive and negative polarity duty cycle and other attributes to separate multi-time-period periods to add more diverse multi-time-period partition functions. The following multi-division function embodiment illustrates the three division functions of Timer1, Timer2, and D/D, and a Timer function option is added to the previous embodiment.

Figure 9:
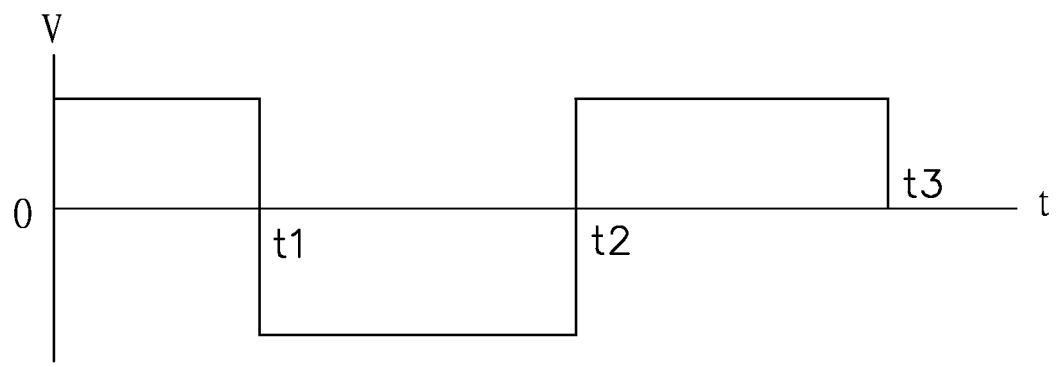
FIG. 9 is a schematic diagram of the DC voltage polarity and conversion time of the first, second and third power of the present invention.
Figure 10:
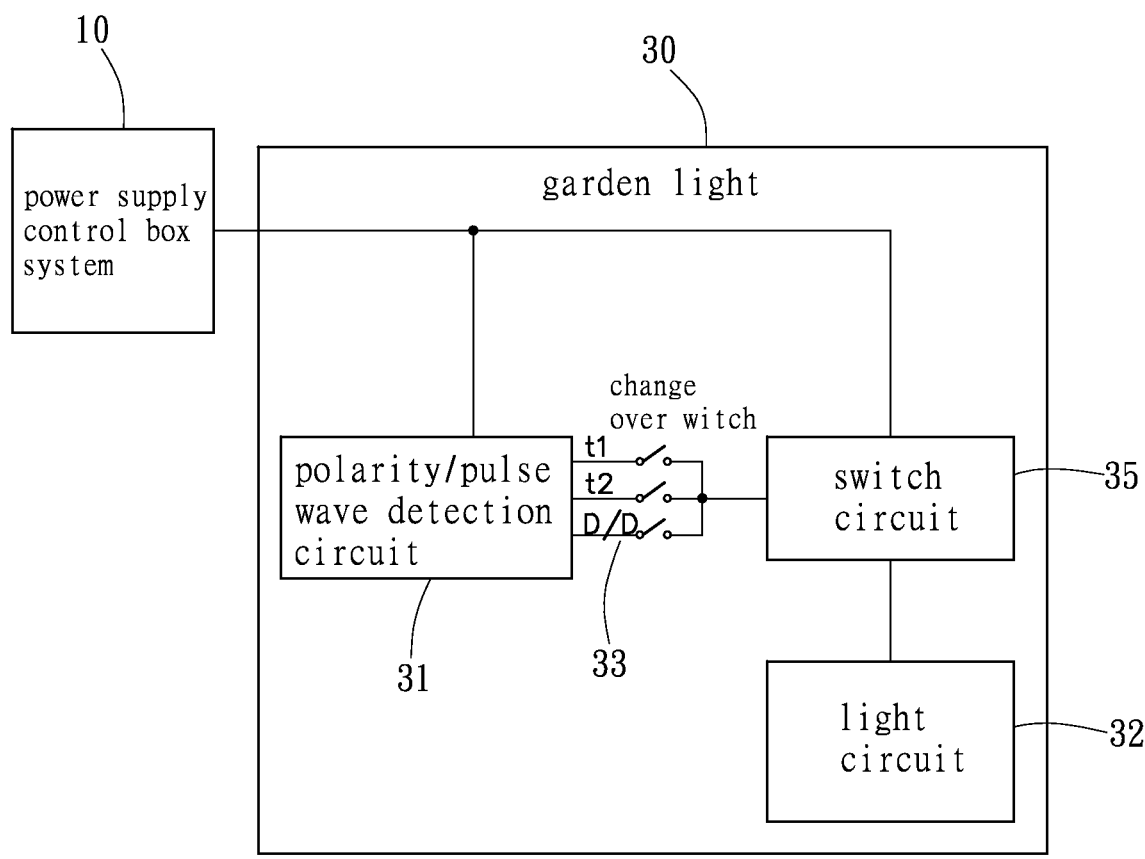
FIG. 10 is a circuit block diagram of an embodiment of the garden light multi-division function of the present invention.

First, take the number of voltage polarity changes as an example to illustrate this embodiment. The voltage polarity conversion transmitted from the power supply control box system 10 is shown in FIG. 9, and FIG. 10 is the system block diagram of the multi-division function embodiment. The garden light 30 circuit is composed of a polarity/pulse wave detection circuit 31, a change over switch 33, a switch circuit 35 and a light circuit 32. The action truth table of the polarity/pulse wave detection circuit 31 is shown in FIG. 15. When the power supply control box system 10 transmits the first positive voltage polarity, the t1 (Timer1), t2 (Timer2) and D/D output terminals of the change over switch 33 are all set to output enable signals. When it is detected that the first positive voltage output of the power supply control box system 10 is converted (at the time t1) to a negative voltage (the second voltage waveform), the t1 output terminal is converted to output a disable signal, and the t2 and D/D output terminals maintain the enable signal. After detecting that the negative polarity voltage (second voltage waveform) output by the power supply control box system 10 is converted (at the time t2) to a positive polarity voltage again, the t2 output terminal is also converted to output a disable signal, and the t1 output terminal still maintains the disabling signal, and the D/D output terminal still maintains the enable signal. The switch circuit 35 is used to select the output signals of the t1, t2 or D/D output terminals of the polarity/pulse wave detection circuit 31 according to the switch position of the change over switch 33. The enable or disable signal received controls whether the power output from the power supply control box system 10 passes through the switch circuit 35, so that the LED light (or traditional bulb) of the light circuit 32 is turned on or off.

After following the above description, firstly refer to the multi-division function protocol of FIG. 16 to change the polarity of power and voltage. When the power supply control box system 10 using the aforementioned light sensor circuit 15 detects the nightfall, the power supply control box system 10 first transmits a positive voltage. At this time, no matter how the change over switch 33 of each garden light 30 is switched (to t1, t2 or D/D function option shown in FIG. 10), the t1, t2 and D/D output terminals all output enable signals. Because the t1, t2 and D/D output terminals all output enable signals at this time, the switch circuit 35 will be operated, so that the light circuits 32 will receive power and light up. After that, the power supply control box system 10 switches to transmit negative polarity voltage (the second voltage waveform) when the time reaches t1 (as shown in FIG. 9). At this time, the t1 output terminals of the garden lights 30 with the change over switches 33 switched to the t1 function will be converted to output a disable signal, so the switch circuits 35 will be disconnected, and those garden lights 30 will have no power and will be turned off. For other garden lights 30 that are selected to perform the t2 or D/D function, because the t2 or D/D output terminals still maintain the enable signal, the switch circuits 35 maintain the conduction function, so that those garden lights 30 keep on lighting. After that, when the time reaches t2, the power supply control box system 10 is switched to transmit a positive voltage. At this time, the t2 output terminals of the garden lights 30 with the change over switches 33 switched to the t2 function will be converted to output a disable signal, which will disconnect the switch circuits 35, so that those garden lights 30 will have no power and will be turned off. For the garden lights 30 whose change over switches 33 are selected to the D/D function, the D/D output terminals still maintain the enable signal, and the switch circuits 35 maintain the conduction function, so that those garden lights 30 keep on lighting. When the power supply control box system 10 detects the dawn at t3, it stops transmitting power to the power supply line 40, and all the garden lights are turned off.

Figure 11:
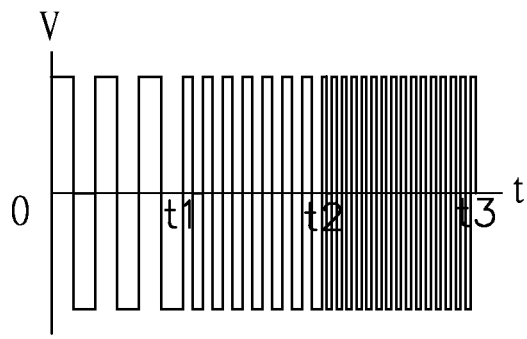
FIG. 11 shows a schematic diagram of the waveforms of the three different voltage polarity conversion frequencies of the present invention in diagram (a), and a schematic diagram of the waveforms of the three different voltage positive and negative polarity conversion cycles of the present invention in diagram (b).
Figure 11:
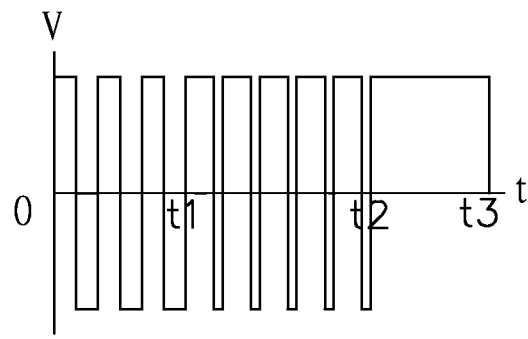

Example of Changing Frequency and Changing Duty Cycle:

The above-mentioned embodiments illustrate that multi-time-period division control is performed by changing the voltage polarity of the power supply at different time periods. Similarly, the same control can also be achieved by using different polarity conversion frequencies or different duty cycles at different time periods. For the aforementioned "multi-division function embodiment" with three time periods, the first power signal, the second power signal and the third power signal are changed to output low, medium, and high voltage waveforms with different polarity conversion frequencies, such as 1 Hz, 5 Hz, 10H, as shown in diagram (a) in FIG. 11, or output 50%, 75% and 100% voltage waveforms with different positive and negative polarities in three periods as shown in diagram (b) in FIG. 11. The polarity/pulse wave detection circuits 31 of the garden lights 30 are also changed to a detection circuit that can identify the frequency of the voltage polarity change, or a detection circuit that can identify the positive and negative polarity working cycles. The detection conditions of the polarity/pulse wave detection circuit 31 and the relationship of the power signal in the three divisions, such as the protocol of the multi-division function embodiment are shown in FIG. 17 for transforming the power voltage polarity frequency, and in FIG. 18 for transforming power voltage polarity duty cycle. In this way, through the detection results of the polarity/pulse wave detection circuit 31, the three periods ending at t1, t2, and t3 can be judged.

Following the above description, during the period from nightfall to time t1, regardless of whether the user switches the change over switches 33 to t1, t2 or D/D, the power supply control box system 10 is converted to output the first power signal, which will activate the switch circuits 35, so that the light circuits 32 will receive power and light up. When the time reaches t1, the power supply control box system 10 is converted to output a second power signal (different polarity conversion frequency or different duty cycle), some gardens lights 30 with the change over switches 33 switched to t1, the output terminals t1 changes frequency or duty cycle due to the voltage of the second power, and the detection result of the polarity/pulse wave detection circuits 31 is not in the range of output the enable signal, so the corresponding switch circuits 35 are disconnected, and the light circuits 32 are turned off without power, while the other garden lights 30 that are switched to t2 or D/D keep lighting. When the time reaches t2, the power supply control box system 10 is converted to output a third power signal. At this time, the garden lights 30 with the change over switches 33 switched to t2, due to the voltage conversion frequency or duty cycle of the third power, the switch circuits 35 are not in the range of output enable signal and no longer output the enable signal, so that the corresponding light circuits 32 have no power and these gardens lights 30 are turned off. The garden lights 30 that are switched to D/D keep lighting. When the power supply control box system 10 detects dawn at t3, it stops transmitting power and turns off all the garden lights. In the same way, by changing the different voltage polarities of the power supply, the positive and negative polarity conversion frequency or the positive and negative polarity duty cycle and other state changes in additional time periods, the garden lighting control system can control the selection of each garden light 30 and perform more multi-time-period and zone lighting functions.

Figure 12:
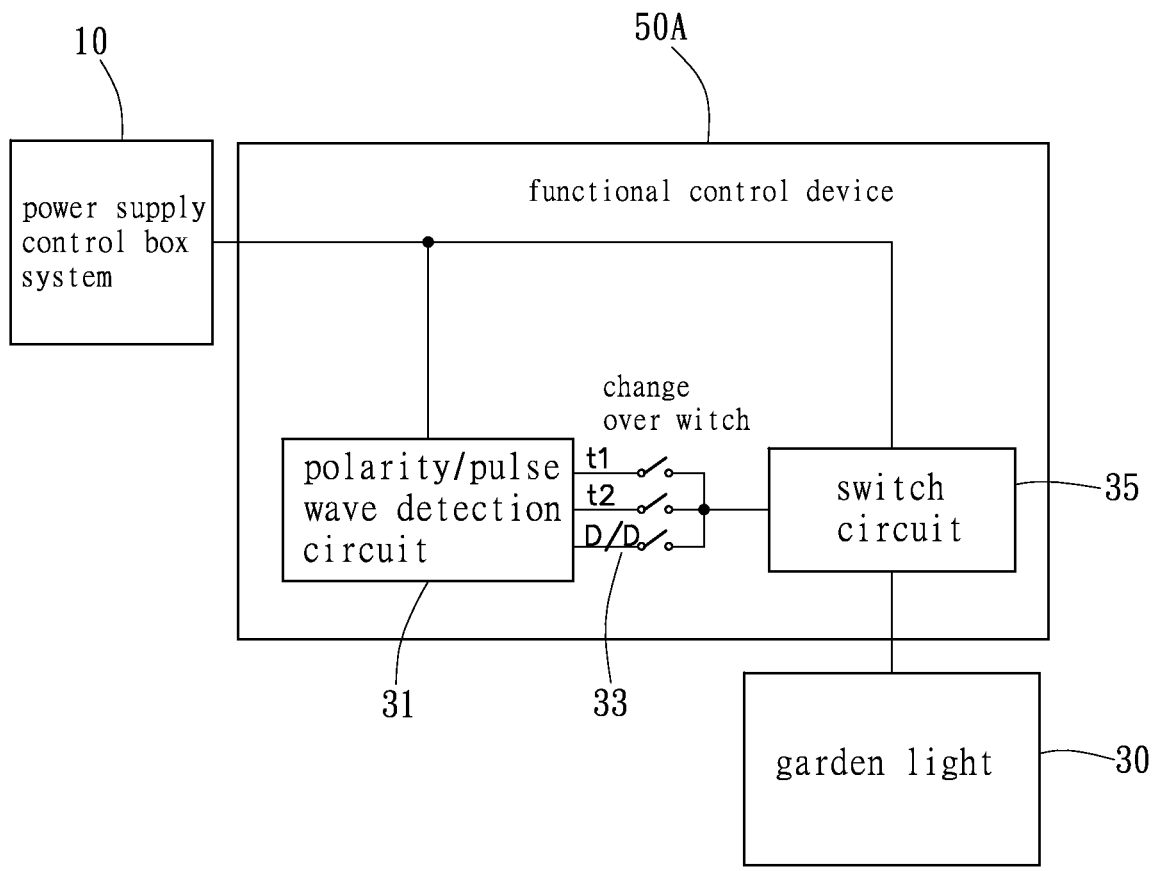
FIG. 12 is a schematic diagram of the function selection and polarity recognition unit of the present invention independent of the garden lights.

Example of Function Control Device Independent of Garden Lights:

Refer to the FIG. 12 showing the schematic diagram of function selection and polarity recognition unit independent of garden lights. In the above-mentioned embodiment, the garden light circuit is composed of a polarity/pulse wave detection circuit 31, a light circuit 32, a change over switch 33 and a switch circuit 35. The polarity/pulse wave detection circuit 31, change over switch 33, switch circuit 35 can be combined into a functional control device 50A. The functional control device 50A can be installed outside the garden light 30 and between the power supply line 40 and the garden light 30, so that the circuit of the garden light 30 can be simpler and more economically available.

The above-mentioned independent functional control device 50A is not limited in shape and structure, and can be independently packaged into a control box device, or it can be packaged in a connector between the output circuit of the power supply control box system 10 and the garden light 30. The independently packaged functional control device 50A can also be installed as a group control device 50B, as shown in the schematic diagram of the group control system in FIG. 13. The group control device 50B is used to connect several garden lights 30 in the garden light group 30a with similar locations and the same functional requirements and control these garden light groups 30a to perform the same lighting function. Different group control devices can select different lighting function options, such as the above-mentioned t1, t2 or D/D division multi-time-period lighting function.

Figure 14:
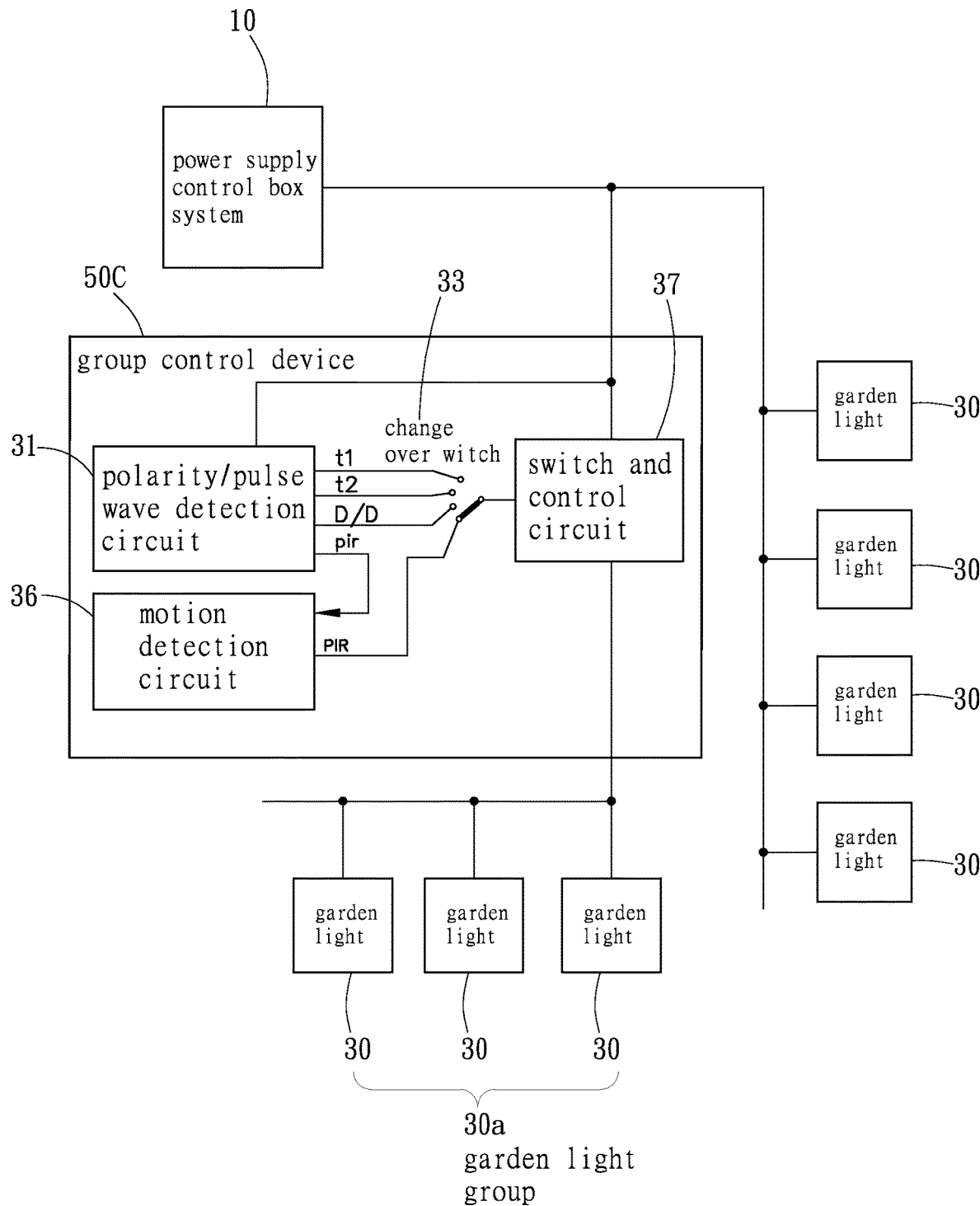
FIG. 14 is a block diagram of the motion detection circuit and controlled garden light group added to the group control device of the present invention.
Figure 3:
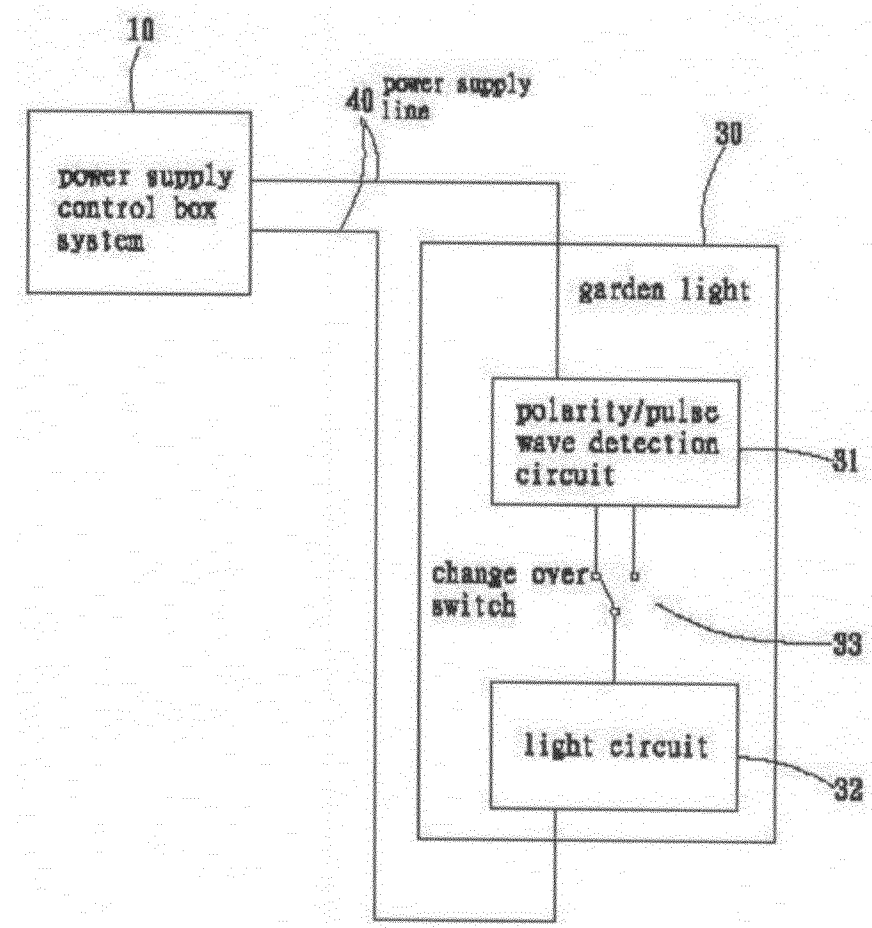

Example of Group Control and Compound Multi-Division Function:

In addition to the above-mentioned ability of the power supply control box system 10 to activate the polarity conversion control signal to achieve the multi-division garden light function, the group control device 50B provides additional function options and circuit interfaces to integrate such as motion detection circuit and other additional functional circuits, control the garden light group 30a under its jurisdiction, select and perform more diverse lighting functions. The system block diagram of this embodiment is shown in FIG. 14. The internal circuit of the group control device 50C includes a function selection circuit that combines the polarity/pulse wave detection circuit 31 and the change over switch 33, a motion detection circuit 36, and a switch and control circuit 37. As in the previous two embodiments, the system can be set to turn off the lights after a period of time from the beginning of the night, or it can be set to turn on the lights after a period of time at night and turn off the lights until dawn. These multi-time-period and periodical functions have been described in detail in the previous two embodiments. This embodiment is aimed at other amplification functions. Taking the motion detection function as an example, the control method is as follows:

Refer to the system protocol of compound multi-division function embodiment in FIG. 19. The power signal output by the power supply control box system 10 in each multi-time-period period is a hybrid modulation voltage polarity conversion frequency and duty cycle. The polarity/pulse wave detection circuit 31 of the group control device 50C will output the enable signal when the detection conditions of each output terminal are satisfied. With the change over switch 33, the switch and control circuit 37 can control the light circuit to achieve the selected function. Assuming that the function option of the group control device 50C is selected to be "motion detection function", when the power supply control box system 10 outputs the first power signal in the first multi-time-period period after nightfall, the transformation frequency F of the voltage waveform=1 Hz, Duty cycle=50%, does not meet the condition of enabling signal detection at the PIR output terminal of the polarity/pulse wave detection circuit 31. Therefore, there is no enable signal output at the PIR output terminal, so that the motion detection circuit 36 is not activated, and the switch and control circuit 37 is in a non-conducting state, and the rear garden light group 30a does not light up. When the power supply control box system 10 outputs the second power signal in the second multi-time-period period, it will meet the condition of enabling signal detection at the PIR output terminal of the polarity/pulse wave detection circuit 31 because the transformation frequency F of the voltage waveform=5 Hz, Duty cycle=100%. Therefore, the PIR output terminal outputs the enable signal to start motion detection circuit 36. When the motion detection circuit 36 detects motion, e.g. due to the approach of people and vehicles, it turns on the switch and control circuit 37 through its PIR output terminal, and turns on the garden lights 30 in the group 30a to achieve the effect of effective lighting for the approaching people and vehicles. When people and vehicles leave for a period of time, the motion detection circuit 36 will turn the PIR output into a disable signal, controlling the switch and control circuit 37 to turn off the garden lights 30 in the group 30a. This cycle will continue until the power supply control box system 10 detects the dawn, stops outputting power, and turns off the garden lights. Similarly, the polarity/pulse wave detection circuit 31 can also be changed to apply different detection conditions, e.g. according to another system protocol of the compound multi-division function embodiment of FIG. 20. When the power supply control box system 10 outputs the first power signal in the first multi-time-period period after nightfall, the motion detection function is activated, and in the second multi-time-period period, the power supply control box system 10 outputs the second power signal to turn off motion detection. In addition, the compound multi-division function of the present invention is not limited to be used in garden light groups. When the internal circuit of the group control device 50C of this embodiment is integrated back to the independent garden light 30, the independent garden light 30 will have multiple functional options combined with motion detection. According to this control method, the multi-time-period period can be expanded as needed, and it can also be expanded to provide garden light color temperature, brightness and other functions to meet the lighting needs of more multi-time-period and multi-division functions.

The foregoing embodiments are only examples of the main technology of the present invention, and are not intended to limit the technical scope of the invention. Anything that involves equivalent applications or simple changes or replacements based on the previous technical means is regarded as within the scope of the claims for the present invention.

What is claimed is:

1. A garden lighting control system, comprising a power supply control box system, a power supply line connected to said power supply control box system and a plurality of garden lights connected to said power supply line,
    wherein:
    said power supply control box system is disposed to receive a light sensor circuit signal and a time signal from a timer circuit, output power of a first voltage waveform to said power supply line upon receiving said light sensor circuit signal indicating detection of a change from day to night, and to stop outputting power to said power supply line upon receiving said light sensor circuit signal indicating detection of a change from night to day;
    when the time signal received from said timer circuit corresponds to a first set time point, said power supply control box system stops outputting the power of said first voltage waveform to said power supply line, and at the same time converts to output power of a second voltage waveform to said power supply line; and
    said plurality of garden lights each perform a first action when receiving the power of said first voltage waveform, said first action allowing the power of said first voltage waveform to pass through to light up said respective garden light; said plurality of garden lights are each controlled by a change over switch or electrical connector to perform a second action when the power of said second voltage waveform is received, said second action turning off said respective garden light or adjusting the brightness of said respective garden light,
    wherein said plurality of garden lights each comprise a light circuit and said change over switch or electrical connector, said change over switch or electrical connector being electrically connected between said light circuit and said power supply line; said change over switch or electrical connector is used to switch to a first path, said first path continuously performing said first action to allow the power of said second voltage waveform to pass through to light up the respective garden light when it receives the power of said second voltage waveform.

2. The garden lighting control system as claimed in claim 1, wherein said change over switch or electrical connector of each said garden light is used to switch to a second path, said second path continuously performing said second action to allow the power of said second voltage waveform to pass through to turn off said garden light or adjust the brightness when said garden light receives the power of said second voltage waveform.

3. The garden lighting control system as claimed in claim 1, wherein the power of said first voltage waveform is a positive voltage, and the power of said second voltage waveform is a negative voltage; said second action is performed when the respective said garden light receives said negative voltage through said change over switch or electrical connector.

4. The garden lighting control system as claimed in claim 1, wherein the power of said first voltage waveform is a negative voltage, and the power of said second voltage waveform is a positive voltage; said second action is performed when the respective said garden light receives said positive voltage through said change over switch or electrical connector.

5. The garden lighting control system as claimed in claim 1, wherein when the time signal received from said timer circuit corresponds to a second set time point or any other set time point thereafter, said power supply control box system stops the output of the power of the previous voltage waveform, and at the same time converts to output the power of another different voltage waveform to the power supply line; and the plurality of garden lights each will turn off or adjust the brightness of the light if the respective selector switch or electrical connector is switched to receive power from the different voltage waveform.

6. The garden lighting control system as claimed in claim 5, wherein the power of the first voltage waveform is a positive or negative voltage, and the voltage polarity of the power of the different voltage waveform to be output at the second set time point or any other set time point thereafter has the opposite voltage polarity of the power of the previous voltage waveform.

7. The garden lighting control system as claimed in claim 5, wherein the power of the first voltage waveform is a voltage signal with a positive and negative polarity conversion frequency attribute, and the positive and negative polarity conversion frequency of a voltage signal of the power of the different voltage waveform to be output at the second set time point or any other set time point thereafter is different from the positive and negative polarity conversion frequency of the voltage signal of the power of the previous voltage waveform.

8. The garden lighting control system as claimed in claim 5, wherein the power of the first voltage waveform is a voltage signal with a duty cycle attribute of positive and negative polarity conversion, and the positive and negative polarity conversion duty cycle of a voltage signal of the power of the different voltage waveform to be output at the second set time point or any other set time point thereafter is different from the positive and negative polarity conversion duty cycle of the voltage signal of the power of the previous voltage waveform.

9. The garden lighting control system as claimed in claim 5, wherein the power of the first voltage waveform is a composite voltage signal with positive and negative polarity conversion frequency attributes and positive and negative polarity conversion duty cycle attributes, and a composite voltage signal with positive and negative polarity conversion frequency attributes and positive and negative polarity conversion duty cycle attributes of the power of the different voltage waveform to be output at the second set time point or any other set time point thereafter is different from the composite voltage signal of the previous power.

10. The garden lighting control system as claimed in claim 5, wherein said garden lights each comprise a polarity/pulse wave detection circuit, a switch control circuit, a light circuit and change over switch or electrical connector; said polarity/pulse wave detection circuit is electrically connected to said power supply line to detect the voltage polarity, frequency or duty cycle of the power sent by said power supply control box system; said change over switch or electrical connector is used to provide users with preset lighting functions; the action is generated through the control of said switch control circuit when the detection result of said polarity/pulse wave detection circuit of said light circuit and the presetting of said change over switch or electrical connector conform to a system protocol.

11. The garden lighting control system as claimed in claim 10, further comprising a motion detection circuit, wherein said polarity/pulse wave detection circuit detects the voltage polarity, frequency or duty cycle of said power supply control box system; when the detection result and the change over switch or electrical connector function option meets the conditions for the system to enable the motion detection function, said polarity/pulse wave detection circuit outputs the enable signal to start said motion detection circuit, and said light circuit passes said change over switch or electrical connector and said switch control circuit and is controlled by said motion detection circuit output to turn on or turn off the light.

12. The garden lighting control system as claimed in claim 10, wherein the said polarity/pulse wave detection circuit, said switch control circuit and said change over switch or electrical connector originally contained in each said garden light are independently set outside the respective said garden light.

13. The garden lighting control system as claimed in claim 12, further comprising a group control device, said group control device comprising a polarity/pulse wave detection circuit, a switch control circuit and a change over switch or electrical connector independently arranged outside said garden lights, the output of said switch control circuit of said group control device connecting multiple external said garden lights to form a partitioned garden light group and uniformly controlling the lighting of said garden light group according to the power signal transmitted by said power supply control box system and the system protocol.

* * * * *

UNITED STATES PATENT AND TRADEMARK OFFICE
CERTIFICATE OF CORRECTION

| | | |
|---|---|---|
| PATENT NO. | : 11,324,098 B1 | |
| APPLICATION NO. | : 17/203760 | |
| DATED | : May 3, 2022 | |
| INVENTOR(S) | : Jerry Yang | |

It is certified that error appears in the above-identified patent and that said Letters Patent is hereby corrected as shown below:

In the Drawings

Please replace Fig 3 with Fig 3 as shown on the attached page.

Signed and Sealed this
Twenty-fifth Day of October, 2022

Katherine Kelly Vidal
*Director of the United States Patent and Trademark Office*